(12) United States Patent
Maeda et al.

(10) Patent No.: US 11,142,243 B2
(45) Date of Patent: Oct. 12, 2021

(54) STEERING CONTROL DEVICE

(71) Applicant: JTEKT CORPORATION, Osaka (JP)

(72) Inventors: Shingo Maeda, Okazaki (JP); Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 135 days.

(21) Appl. No.: 16/255,079

(22) Filed: Jan. 23, 2019

(65) Prior Publication Data

US 2019/0233005 A1 Aug. 1, 2019

(30) Foreign Application Priority Data

Jan. 30, 2018 (JP) .............................. JP2018-014081

(51) Int. Cl.
*B62D 6/04* (2006.01)
*B60W 40/064* (2012.01)
*B62D 6/00* (2006.01)

(52) U.S. Cl.
CPC ............. *B62D 6/04* (2013.01); *B60W 40/064* (2013.01); *B62D 6/008* (2013.01); *B60W 2520/125* (2013.01); *B60W 2520/14* (2013.01); *B60W 2552/40* (2020.02); *B60W 2710/20* (2013.01)

(58) Field of Classification Search
None
See application file for complete search history.

(56) References Cited

U.S. PATENT DOCUMENTS

| 10,384,711 | B2* | 8/2019 | Kodera | ................. | B62D 5/003 |
| 10,583,856 | B2* | 3/2020 | Miyashita | .............. | B62D 5/003 |
| 2004/0019417 | A1* | 1/2004 | Yasui | .................. | B60W 40/101 |
| | | | | | 701/36 |
| 2005/0067213 | A1* | 3/2005 | Yasui | .................... | B60W 30/02 |
| | | | | | 180/443 |
| 2007/0176488 | A1* | 8/2007 | Miyajima | .............. | B62D 11/24 |
| | | | | | 303/146 |

(Continued)

FOREIGN PATENT DOCUMENTS

| DE | 10 2009 002245 A1 | 10/2010 | | |
| EP | 2803558 A2 * | 11/2014 | ............. | B62D 6/008 |

(Continued)

OTHER PUBLICATIONS

Jul. 2, 2019 Search Report issued in European Patent Application No. 19154215.8.

*Primary Examiner* — Tuan C To
(74) *Attorney, Agent, or Firm* — Oliff PLC

(57) ABSTRACT

Provided is a steering control device that controls a steer-by-wire steering system for a vehicle and that is capable of reducing erroneous detection of a grip state and improving the robustness in controlling a steering reaction force. The control device includes a road surface axial force calculation circuit that calculates a road surface axial force, based on road surface information. The control device includes a second estimated axial force calculation circuit that calculates a lateral force applied to a rack shaft, based on a yaw rate and a lateral acceleration. The control device includes a grip factor calculation circuit that calculates a grip factor, based on the road surface axial force and the lateral force. The control device varies the steering reaction force in accordance with the grip factor.

4 Claims, 6 Drawing Sheets

(56) References Cited

U.S. PATENT DOCUMENTS

| | | | |
|---|---|---|---|
| 2010/0152971 A1* | 6/2010 | Shiino | B62D 5/09 |
| | | | 701/41 |
| 2012/0197493 A1* | 8/2012 | Fujimoto | B62D 5/0463 |
| | | | 701/41 |
| 2013/0245890 A1* | 9/2013 | Kageyama | B62D 7/18 |
| | | | 701/41 |
| 2017/0136877 A1* | 5/2017 | Boss | G06F 3/012 |
| 2017/0217485 A1* | 8/2017 | Oshima | B62D 6/002 |
| 2017/0267276 A1 | 9/2017 | Kodera et al. | |
| 2019/0100203 A1* | 4/2019 | Imamura | B60W 40/064 |

FOREIGN PATENT DOCUMENTS

| | | | |
|---|---|---|---|
| EP | 3 219 580 A1 | 9/2017 | |
| EP | 3219580 A1 * | 9/2017 | B62D 6/008 |
| EP | 2772413 B1 * | 11/2017 | B62D 5/0463 |
| JP | 2009-040341 A | 2/2009 | |
| JP | 2017-165219 A | 9/2017 | |
| WO | WO-2010103810 A1 * | 9/2010 | B62D 7/159 |
| WO | WO-2017159843 A1 * | 9/2017 | H02P 6/34 |

* cited by examiner

STEERING CONTROL DEVICE

INCORPORATION BY REFERENCE

The disclosure of Japanese Patent Application No. 2018-014081 filed on Jan. 30, 2018 including the specification, drawings and abstract, is incorporated herein by reference in its entirety.

BACKGROUND OF THE INVENTION

1. Field of the Invention

The present invention relates to a steering control device.

2. Description of Related Art

Japanese Patent Application Publication No. 2009-40341 (JP 2009-40341 A) discloses a method of detecting a tire grip state (for example, a grip loss degree indicating how much tire grip is lost) in an electric power steering system, and varying a steering assist force in accordance with the grip loss degree.

The grip loss degree is obtained by calculating a difference between a first self-aligning torque (SATa) and a second self-aligning torque (SATb). The first self-aligning torque is calculated based on: an assist torque calculated based on a steering torque; the inertia of an electric motor that applies the assist torque; and a friction force. The second self-aligning torque is calculated as a product of a lateral force applied to a tire and a trail.

Meanwhile, a steering control device for a steer-by-wire steering system in which power is not transmitted between steered wheels and a steering wheel is configured to control a reaction force actuator to apply a steering reaction force to the steering wheel in accordance with road surface information (Japanese Patent Application Publication No. 2017-165219 (JP 2017-165219 A)).

JP 2017-165219 A focuses on an axial force that is applied to a steering operation shaft coupled to steered wheels, and determines a steering reaction force based on the allocation of an ideal axial force and a road surface axial force. The ideal axial force is calculated from a target steered angle obtained based on a steering angle of the steering wheel. The road surface axial force is calculated from road surface information.

The steering control device disclosed in JP 2017-165219 A may be configured to detect a grip state from the difference between the road surface axial force and the ideal axial force, and transmit the effect of a grip loss due to a low μ road or the like to the driver based on the detection result.

The road surface information (for example, a drive current of a steering operation actuator) is a component reflecting the actual load condition between the steered wheels and the road surface. Meanwhile, the ideal axial force based on the steering angle does not reflect any effect on the axial force that varies, for example, when the steered wheel is replaced, or when the air pressure of the steered wheel changes. Therefore, if the grip state based on a grip loss is determined from the difference between the road surface axial force and the ideal axial force, an erroneous detection may occur.

Note that the method of detecting a grip state disclosed in JP 2009-40341 A uses, for example, an assist torque as a parameter used for detection of the grip loss degree, and therefore is not applicable to a steering control device that controls a steer-by-wire steering system for a vehicle.

SUMMARY OF THE INVENTION

An object of the present invention is to provide a steering control device that controls a steer-by-wire steering system for a vehicle and that is capable of reducing erroneous detection of a grip state and improving the robustness in controlling a steering reaction force.

According to an aspect of the present invention, there is provided a steering control device that controls a steer-by-wire steering system for a vehicle, the steering control device including: a steering operation control circuit that controls a steering operation actuator of the steer-by-wire steering system in accordance with a steering state of a steering wheel, the steering system including a reaction force actuator that applies a steering reaction force against an operation of the steering wheel, and a steering operation actuator that steers steered wheels via a steering operation shaft under a condition where power is not transmitted between the steered wheels and the steering wheel; and a reaction force control circuit that calculates the steering reaction force; wherein the reaction force control circuit includes a first estimated axial force calculation circuit that calculates a first estimated axial force based on road surface information, a second estimated axial force calculation circuit that calculates a second estimated axial force applied to the steering operation shaft based on a vehicle state quantity, and a grip factor calculation circuit that calculates a grip factor based on the first estimated axial force and the second estimated axial force; and wherein the reaction force control circuit varies the steering reaction force in accordance with the grip factor.

With the configuration described above, even when the steered wheel is replaced or when the air pressure of the steered wheel changes, it is possible to reduce erroneous detection of the grip state, and improve the robustness in controlling the steering reaction force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering control device that controls a steer-by-wire steering system for a vehicle according to an embodiment of the present invention will be described with reference to FIGS. 1 to 6.

Figure 1:
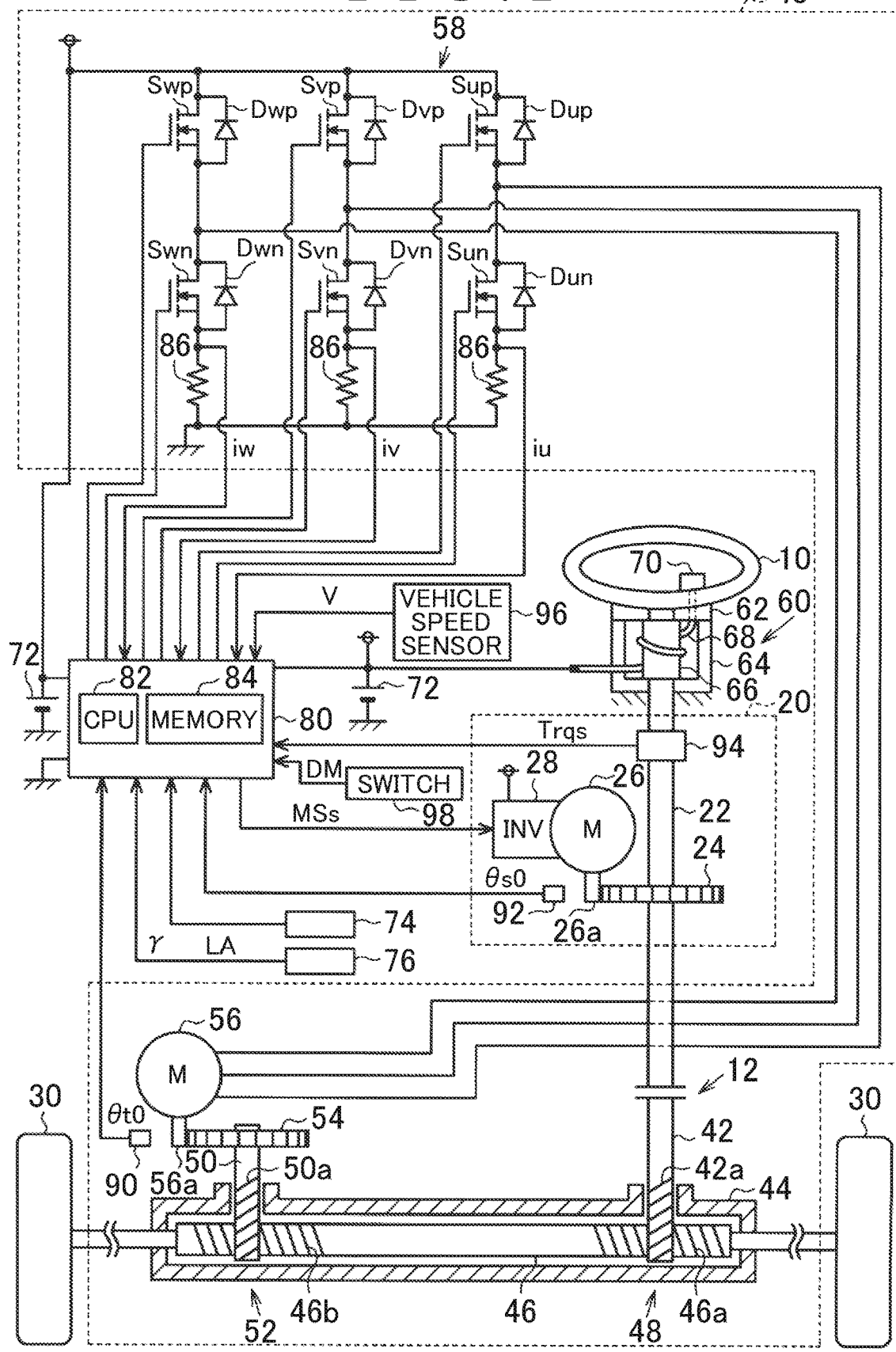
FIG. 1 illustrates a steering control device and control objects according to an embodiment.

As illustrated in FIG. 1, in a steering system according to the present embodiment, a steering wheel 10 is connected to a reaction force actuator 20 that applies a reaction force against an operation of the steering wheel 10. The reaction force actuator 20 includes a steering shaft 22 fixed to the steering wheel 10, a reaction force reducer 24, a reaction force motor 26 with a rotating shaft 26a coupled to the reaction force reducer 24, and an inverter 28 that drives the reaction force motor 26. The reaction force motor 26 that applies a steering reaction force to the driver is a surface permanent magnet synchronous motor (SPMSM).

The reaction force motor 26 is connected to a battery 72 via the inverter 28. The inverter 28 is a circuit that connects and disconnects between each of a positive electrode and a negative electrode of the battery 72 and each of three terminals of the reaction force motor 26. The steering shaft 22 can be coupled to a pinion shaft 42 of a steering operation actuator 40 via a clutch 12.

The steering operation actuator 40 includes a first rack-and-pinion mechanism 48, a second rack-and-pinion mechanism 52, an SPMSM (steering operation motor 56), and an inverter 58. The first rack-and-pinion mechanism 48 includes a rack shaft 46 as a steering operation shaft and the pinion shaft 42 arranged at a predetermined crossing angle. First rack teeth 46a formed on the rack shaft 46 mesh with pinion teeth 42a formed on the pinion shaft 42. Steered wheels 30 are coupled to opposite ends of the rack shaft 46 via respective tie rods.

The second rack-and-pinion mechanism 52 includes the rack shaft 46 and a pinion shaft 50 arranged at a predetermined crossing angle. Second rack teeth 46b formed on the rack shaft 46 mesh with pinion teeth 50a formed on the pinion shaft 50.

The pinion shaft 50 is connected to a rotating shaft 56a of the steering operation motor 56 via a steering operation reducer 54. The inverter 58 is connected to the steering operation motor 56. The rack shaft 46 is housed in a rack housing 44.

In FIG. 1, reference characters for MOS field effect transistors (switching elements) included in the inverter 58 and connected to three terminals of the steering operation motor 56 include u, v, and w. Reference characters for MOS field effect transistors included in the inverter 58 and arranged on an upper arm and on a lower arm include p and n, respectively. In the following description, u, v, and w are collectively represented as $, and p and n are collectively represented as #. That is, the inverter 58 includes a serial connection member including switching elements S$p that connect and disconnect between the positive electrode of the battery 72 and each terminal of the steering operation motor 56 and switching elements S$n that connect and disconnect between the negative electrode of the battery 72 and each terminal of the steering operation motor 56 such that the switching elements S$p are connected in series with the switching elements S$n. Diodes D$# are connected in inverse parallel with the switching elements S$#.

A spiral cable device 60 is coupled to the steering wheel 10. The spiral cable device 60 includes a first housing 62 fixed to the steering wheel 10, a second housing 64 fixed to a vehicle body, a tubular member 66 housed in a space defined by the first housing 62 and the second housing 64 and fixed to the second housing 64, and a spiral cable 68 wound around the tubular member 66. The steering shaft 22 is inserted into the tubular member 66. The spiral cable 68 is an electric wire connecting a horn 70 fixed to the steering wheel 10 to, for example, the battery 72 fixed to the vehicle body.

The steering control device (control device 80) performs control to steer the steered wheels 30 as control objects in accordance with an operation of the steering wheel 10 by operating the steering system including the reaction force actuator 20 and the steering operation actuator 40. In the present embodiment, the reaction force actuator 20 and the steering operation actuator 40 implement a steer-by-wire system. The control device 80 normally performs control to steer the steered wheels 30 in accordance with an operation of the steering wheel 10 while keeping the clutch 12 disengaged. The control device 80 is an example of a steering operation control circuit and a reaction force control circuit.

In this case, the control device 80 loads a rotation angle θs0 of the rotating shaft 26a of the reaction force motor 26 detected by a steering sensor 92 and a steering torque Trqs applied to the steering shaft 22 and detected by a torque sensor 94. The control device 80 also loads a rotation angle θt0 of the rotating shaft 56a of the steering operation motor 56 detected by a steering operation sensor 90 and a vehicle speed V detected by a vehicle speed sensor 96. The control device 80 also loads a lateral acceleration LA detected by a lateral acceleration sensor 74. The lateral acceleration LA indicates the lateral acceleration applied to the center of the gravity of the vehicle in a direction (lateral direction) orthogonal to a travel direction (longitudinal direction) when the vehicle turns. The control device 80 also loads a yaw rate γ detected by a yaw rate sensor 76.

The control device 80 acquires voltage drops at shunt resistors 86 connected to sources of the switching elements S$n as currents iu, iv, and iw in the inverter 58 to reference the currents iu, iv, and iw. The control device 80 also loads a drive mode DM indicative of a setting state of a control pattern for an onboard engine or the like. The fuel efficiency and responsiveness (direct feeling) of driving of the vehicle to the user's request vary depending on the drive mode DM. For example, the drive mode DM includes an ECO mode that optimizes the output of the engine or the like to improve the fuel efficiency, a normal mode that optimizes the output of the engine or the like to improve the responsiveness to the user's request compared to the ECO mode, and a sports mode that optimizes the output of the engine or the like to improve the responsiveness to the user's request regardless of the fuel efficiency. The drive mode DM is changed by a switch 98 that can be operated by the user.

Specifically, the control device 80 includes a central processing unit (CPU 82) and a memory 84 such that the CPU 82 executes a program stored in the memory 84 to operate the reaction force actuator 20 and the steering operation actuator 40. Thus, a steering reaction force is applied to the driver, and the steered wheels 30 are steered in accordance with a steered angle.

Figure 2:
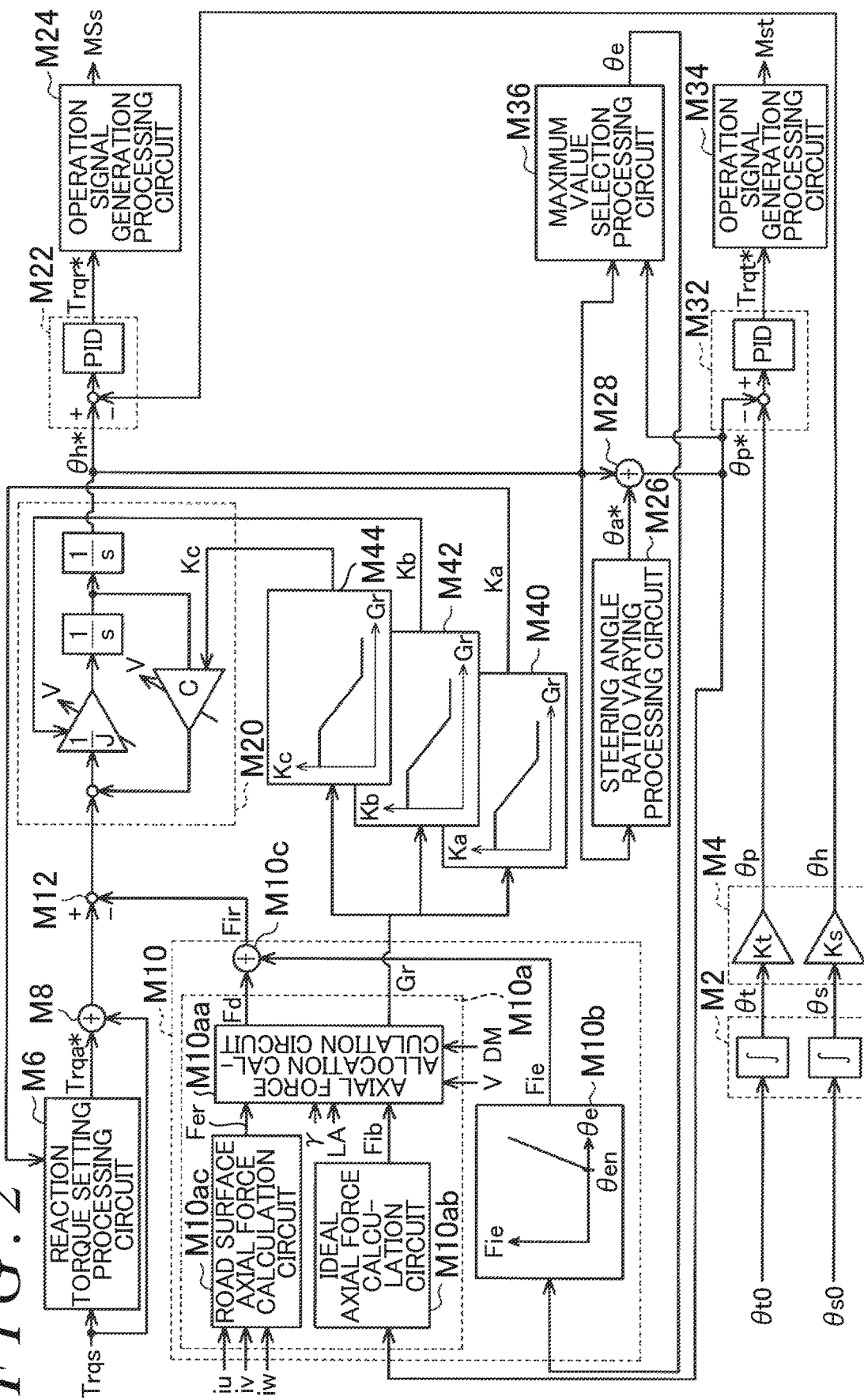
FIG. 2 is a block diagram according to the embodiment.

FIG. 2 illustrates a part of processing executed by the control device 80. The processing illustrated in FIG. 2 represents a part of the processing implemented by the CPU 82 executing the program stored in the memory 84, according to a type of processing implemented.

An integration processing circuit M2 converts the rotation angle θs0 detected by the steering sensor 92 and the rotation angle θt0 detected by the steering operation sensor 90 into numerical values in an angle range greater than an angle range from 0° to 360° so as to obtain rotation angles θs and θt. For example, when the steering wheel 10 is fully rotated clockwise or counterclockwise from a neutral position for causing the vehicle to travel straight, the rotating shaft 26a makes multiple rotations. Therefore, for example, when the rotating shaft 26a makes two rotations in a predetermined direction from the position corresponding to the neutral position of the steering wheel 10, the integration processing circuit M2 provides an output value of 720°. The integration processing circuit M2 provides an output value of zero when the steering wheel 10 is in the neutral position.

A measurement unit setting processing circuit M4 calculates a steering angle θh by multiplying, by a conversion factor Ks, an output value of the steering sensor 92 resulting from the processing by the integration processing circuit M2, and calculates a steered angle θp by multiplying, by a conversion factor Kt, an output value of the steering operation sensor 90 resulting from the processing by the integration processing circuit M2. The conversion factor Ks is preset in accordance with a rotation speed ratio between the reaction force reducer 24 and the rotating shaft 26a of the reaction force motor 26. Thus, the amount of change in the rotation angle θs of the rotating shaft 26a is converted into the amount of rotation of the steering wheel 10. Therefore, the steering angle θh is the rotation angle of the steering wheel 10 with respect to the neutral position. The conversion factor Kt is the product of a rotation speed ratio between the steering operation reducer 54 and the rotating shaft 56a of the steering operation motor 56 and a rotation speed ratio between the pinion shaft 50 and the pinion shaft 42. Thus, the amount of rotation of the rotating shaft 56a is converted into the amount of rotation of the steering wheel 10 that is obtained assuming that the clutch 12 is engaged.

The rotation angles θs and θt, the steering angle θh, and the steered angle θp obtained in the processing of FIG. 2 have positive values when these angles are rotation angles in a predetermined direction, and have negative values when these angles are rotation angles in the opposite direction. For example, when the rotating shaft 26a rotates in the direction opposite to the predetermined direction from the position corresponding to the neutral position of the steering wheel 10, the integration processing circuit M2 provides a negative output value. However, this is only an example of logic for the control system. In particular, for each of the rotation angles θs and θt, the steering angle θh, and the steered angle θp, a large angle as used herein refers to a large amount of change from the neutral position. In other words, a large angle refers to a large absolute value of a parameter which may be either a positive value or a negative value.

A reaction torque setting processing circuit M6 sets a reaction torque Trqa* by multiplying the steering torque Trqs by a first gain Ka loaded from a first gain calculation circuit M40 described below. The value of the reaction torque Trqa* is set to increase as the steering torque Trqs increases. An addition processing circuit M8 adds the steering torque Trqs to the reaction torque Trqa* to output the sum.

A reaction force setting processing circuit M10 sets the reaction force Fir that acts against rotation of the steering wheel 10. Specifically, the reaction force setting processing circuit M10 uses a base reaction force setting processing circuit M10a to set a base reaction force Fd corresponding to an operation of the steering wheel 10, while using a limiting reaction force setting processing circuit M10b to set a limiting reaction force Fie that acts against operative rotation of the steering wheel 10 toward the upper limit when the amount of rotation of the steering wheel 10 approaches an allowable maximum value. The reaction force setting processing circuit M10 uses an addition processing circuit M10c to add the base reaction force Fd and the limiting reaction force Fie together to output the sum as the reaction force Fir. A deviation calculation processing circuit M12 subtracts the reaction force Fir from the output of the addition processing circuit M8 to output the difference.

A target steering angle calculation processing circuit M20 sets a target steering angle θh* based on the output value of the deviation calculation processing circuit M12. Here, a model formula is utilized which is expressed by the following equation (c1) that relates the output value Δ of the deviation calculation processing circuit M12 to the target steering angle θh*.

$$\Delta = Kc \cdot C \cdot \theta h^{*\prime} + (J/Kb) \cdot \theta h^{*\prime\prime} \quad (c1)$$

The model expressed by the above equation (c1) defines the relationship between the torque on and the rotation angle of a rotating shaft that rotates with rotation of the steering wheel 10 in a configuration in which the steering wheel 10 is mechanically coupled to the steered wheels 30. In equation (c1), a viscosity coefficient C is, for example, a modeled friction in the steering system, and an inertia coefficient J is a modeled inertia in the steering system.

The viscosity coefficient C and the inertia coefficient J are variably set according to the vehicle speed V. A second gain Kb and a third gain Kc are loaded from a second gain calculation circuit M42 and a third gain calculation circuit M44 described below, respectively.

A steering angle feedback processing circuit M22 sets a target reaction torque Trqr* that is a target value for the reaction torque generated by the reaction force motor 26 as a manipulated variable used to adjust the steering angle θh to the target steering angle θh* for feedback control. Specifically, the target reaction torque Trqr* is the sum of output values of a proportional element, an integral element, and a differential element to which a value obtained by subtracting the steering angle θh from the target steering angle θh* is input.

An operation signal generation processing circuit M24 generates an operation signal MSs for the inverter 28 based on the target reaction torque Trqr* and outputs the operation signal MSs to the inverter 28. This can be implemented, for example, based on well-known current feedback control in which a command value for a q-axis current is set based on the target reaction torque Trqr* and in which voltage command values for a d-axis and a q-axis are set as manipulated variables used to adjust currents on the d-axis and the q-axis to the command values for feedback control. The d-axis current may be controlled to zero. However, if the reaction force motor 26 rotates at a high speed, the absolute value of the d-axis current may be set to a value greater than zero to allow field weakening control to be performed. Of course, the absolute value of the d-axis current may be set to a value greater than zero in a low rotation speed range.

A steering angle ratio varying processing circuit M26 sets a target operating angle θa* used to variably set a steering angle ratio that is a ratio between the steering angle θh and the steered angle θp, based on the target steering angle θh*. An addition processing circuit M28 calculates the target steered angle θp* by adding the target operating angle θa* to the target steering angle θh*.

A steered angle feedback processing circuit M32 sets a target steered torque Trqt* generated by the steering operation motor 56, as a manipulated variable used to adjust the steered angle θp to the target steering angle θp* for feedback control. Specifically, the target steered torque Trqt* is the sum of output values of a proportional element, an integral element, and a differential element to which a value obtained by subtracting the steered angle θp from the target steered angle θp* is input.

An operation signal generation processing circuit M34 generates an operation signal MSt for the inverter 58 based on the target steered torque Trqt*, and outputs the operation signal MSt to the inverter 58. This is executed similarly to the generation processing for the operation signal executed by the operation signal generation processing circuit M24. A maximum value selection processing circuit M36 selects one of the target steering angle θh* and the target steered angle θp* that has a greater value (maximum value θe), and outputs the maximum value θe.

The base reaction force setting processing circuit M10a receives the target steered angle θp* as an input. Meanwhile, the limiting reaction force setting processing circuit M10b sets the limiting reaction force Fie using the maximum value θe as an input. This setting enables control to increase the force of the steering wheel 10 that acts against a further increase in the steering angle both immediately before an end of the rack shaft 46 displaced in the axial direction comes into contact with a rack housing 44 (rack stopper) and immediately before the steering wheel 10 rotates to an upper limit value determined based on the spiral cable 68. This will be described below.

Figure 3:
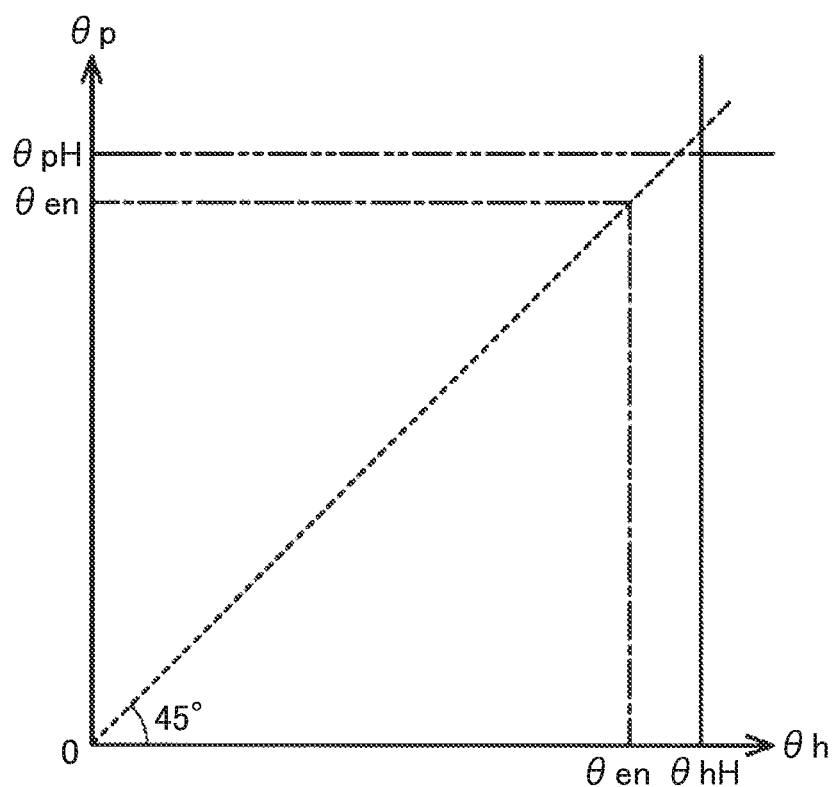
FIG. 3 illustrates thresholds for a steering angle and a steered angle.

FIG. 3 illustrates a relationship between upper limit values θhH and θpH of the steering angle θh and the steered angle θp. In the present embodiment, the upper limit value θhH of the steering angle θh is approximately equal to the upper limit value θpH of the steered angle θp as depicted in FIG. 3. This is achieved by the measurement unit setting processing circuit M4 setting measurement units for the steering angle θh and the steered angle θp. In the present embodiment, the spiral cable 68 is provided with a slight margin in length so that, with the clutch 12 engaged, the steering wheel 10 can further be slightly rotated before the rack shaft 46 displaced in the axial direction comes into contact with the rack housing 44. Thus, the measurement unit setting processing circuit M4 sets the steering angle θh equal to the rotation angle of the steering wheel 10 and sets the steered angle θp equal to the rotation angle of the steering wheel 10 obtained when the target operating angle θa* is assumed to be zero so that the upper limit value θhH of the steering angle θh is approximately equal to the upper limit value θpH of the steered angle θp.

In the present embodiment, a common threshold θen common to the steering angle θh and the steered angle θp is set so that the reaction force of the steering wheel 10 is controlled to increase before both the steering angle θh and the steered angle θp reach the respective upper limit values θhH and θpH. The limiting reaction force setting processing circuit M10b illustrated in FIG. 2 includes a map defining the relationship between the maximum value θe and the limiting reaction force Fie. The map indicates that, when equal to or greater than the common threshold θen, the maximum value θe is greater than zero and in particular that the maximum value θe is set to be large enough to prevent further operation of the steering wheel by the human force when greater than the common threshold θen by a certain value. Although FIG. 2 only illustrates that the limiting reaction force Fie increases as the maximum value θe increases in a predetermined rotating direction from zero, the absolute value of the limiting reaction force Fie increases even when the maximum value θe increases in a direction opposite to the predetermined rotating direction. However, the limiting reaction force Fie in the processing in FIG. 2 has a negative value in the case of a rotating direction opposite to the predetermined rotating direction.

In the present embodiment, the reaction force setting processing circuit M10 includes an axial force allocation calculation circuit M10aa that performs calculation for setting a base reaction force Fd as an allocated component in which an ideal axial force Fib and a road surface axial force Fer are allocated in a predetermined ratio so as to incorporate an axial force applied to the steered wheels 30 from the road surface, as illustrated in FIG. 2. The axial force applied to the steered wheels 30 is road surface information transmitted from the road surface to the steered wheels 30.

The reaction force setting processing circuit M10 further includes an ideal axial force calculation circuit M10ab that calculates, as a component of the base reaction force Fd, the ideal axial force Fib that is an ideal value for the axial force applied to the steered wheels 30 (the force transmitted to the steered wheels 30) and that is also an ideal component in which the road surface information is not incorporated. The ideal axial force calculation circuit M10ab calculates the ideal axial force Fib based on the target steered angle θp*. For example, the absolute value of the ideal axial force Fib is set to increase as the absolute value of the target steered angle θp* increases.

The reaction force setting processing circuit M10 further includes a road surface axial force calculation circuit M10ac that calculates, as a component of the base reaction force Fd, the road surface axial force Fer that is an estimated value of axial force applied to the steered wheels 30 (the force transmitted to the steered wheels 30) and that is also a road surface component in which the road surface information is incorporated. The road surface axial force calculation circuit M10ac obtains the currents iu, iv, and iw that are actual current values of the steering operation motor 56 to calculate a q-axis current iq from the currents iu, iv, and iw, and then calculates the road surface axial force Fer based on the q-axis current iq. The road surface axial force Fer corresponds to a first estimated axial force. The road surface axial force calculation circuit M10ac is an example of a first estimated axial force calculation circuit.

Calculation of the q-axis current iq can be achieved by conversion into a dq-axes coordinate system that is a rotary coordinate system, based on the rotation angle θt0 of the steering operation motor 56. The road surface axial force calculation circuit M10ac calculates the road surface axial force Fer by multiplying the q-axis current iq by a predetermined coefficient K1. The predetermined coefficient K1 is set based on a gear ratio of the steering operation reducer 54, a ratio between the torque on the pinion shaft 42 and the axial force on the rack shaft 46, and a torque constant. That is, the torque of the steering operation motor 56 is determined by multiplying the q-axis current iq by a constant. The torque of the steering operation motor 56 is converted by the steering operation reducer 54 and the like so that the resulting torque is applied to the rack shaft 46. Thus, multiplication of the q-axis current iq by the predetermined coefficient K1 allows calculation of an axial force applied to the rack shaft 46 by the steering operation motor 56. When a balanced relationship may be considered to be present between the axial force applied to the rack shaft 46 by the steering operation motor 56 and an axial force applied to the steered wheels 30 from the road surface, the axial force applied to the steered wheels 30 from the road surface can be estimated as the road surface axial force Fer. The road surface axial force Fer is a component in which at least the road surface information is incorporated.

Figure 4:
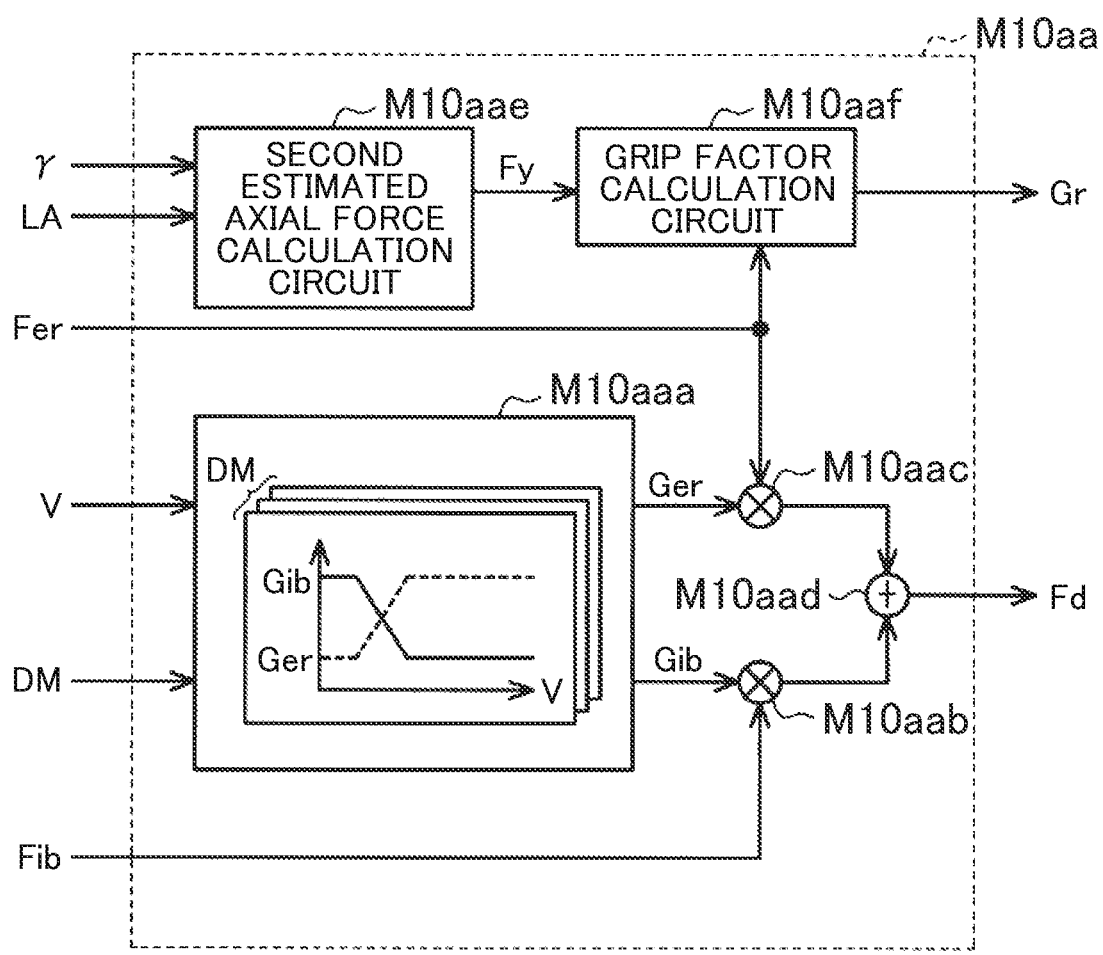
FIG. 4 is a block diagram illustrating an axial force allocation calculation circuit according to the embodiment.

As depicted in FIG. 4, the axial force allocation calculation circuit M10aa includes a gain calculation circuit M10aaa that calculates an allocation gain Gib and an allocation gain Ger that are the allocation rates of the ideal axial force Fib and the road surface axial force Fer for allocation. The gain calculation circuit M10aaa includes a three-dimensional map defining the relationship between the vehicle speed V and the allocation gains Gib and Ger and the drive mode DM selected by the user. The gain calculation circuit M10aaa receives the drive mode DM and the vehicle speed V as inputs to calculate the allocation gains Gib and Ger based on the map. The value of the allocation gain Gib decreases as the vehicle speed V increases, whereas the value of the allocation gain Ger increases as the vehicle speed V increases. The values of the allocation gains Gib and Ger are set such that, for example, the total of the allocation gains Gib and Ger is 1 when the drive mode DM is the above-described ECO mode or normal mode. Meanwhile, for example, when the drive mode DM is the above-described sports mode, the allocation gains Gib and Ger are set to increase the value of the allocation gain Ger so that the total value of the allocation gains Gib and Ger is greater than 1, and particularly to increase the allocation gain Ger as the vehicle speed V increases.

The axial force allocation calculation circuit M10aa uses a multiplication processing circuit M10aab to multiply the output value of the ideal axial force calculation circuit M10ab by the allocation gain Gib. The axial force allocation calculation circuit M10aa also uses a multiplication processing circuit M10aac to multiply the output value of the road surface axial force calculation circuit M10ac by the allocation gain Ger. The axial-force allocation calculation circuit M10aa further uses an addition processing circuit M10aad to calculate the base reaction force Fd by adding the ideal axial force Fib multiplied by the allocation gain Gib to the road surface axial force Fer multiplied by the allocation gain Ger. The axial force allocation calculation circuit M10aa then outputs the base reaction force Fd.

The axial force allocation calculation circuit M10aa further includes a second estimated axial force calculation circuit M10aae and a grip factor calculation circuit M10aaf. The second estimated axial force calculation circuit M10aae receives the yaw rate $\gamma$ and the lateral acceleration LA, and calculates a lateral force Fy as a second estimated axial force using the following equation (c2). The yaw rate $\gamma$ and the lateral acceleration LA are examples of vehicle state quantities.

$$\text{Lateral Force } Fy = K1 \times \text{Lateral Acceleration } LA + K2 \times \gamma' \quad (c2)$$

where $\gamma'$ is a differential value of the yaw rate $\gamma$; and K1 and K2 are coefficients preset based on test values or the like.

The grip factor calculation circuit M10aaf receives the lateral force Fy and the road surface axial force Fer, and calculates a grip factor Gr using the following equation (c3):

$$\text{Grip Factor } Gr = (K3 \times \text{Road Surface Axial Force } Fer)/(K4 \times \text{Lateral Force } Fy) \quad (c3)$$

where K3 and K4 are coefficients preset based on test values or the like.

Relationship Between Self-Aligning Torque SAT and Lateral Force Fy

The relationship between a self-aligning torque SAT and a lateral force Fy will be described with reference to FIGS. 5 and 6.

Figure 5:
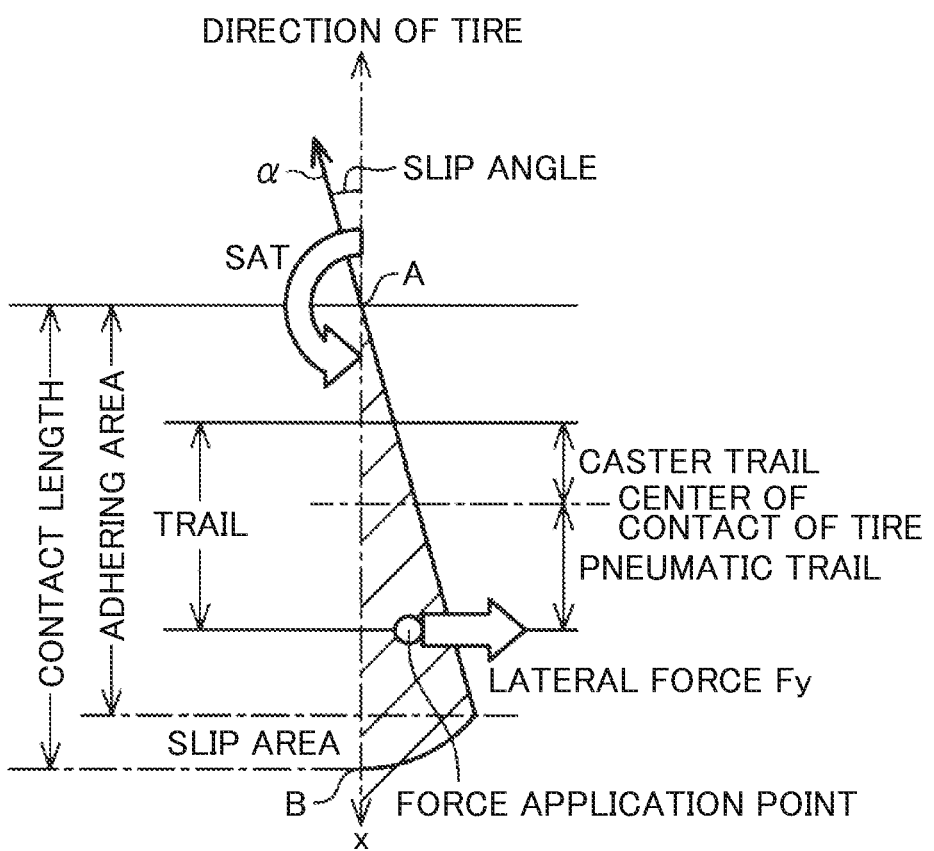
FIG. 5 is an explanatory diagram illustrating a lateral force applied to a force application point, self-aligning torque, and pneumatic trail.

FIG. 5 illustrates a contact patch of a steered wheel with a slip angle viewed from above. A center line x extending in the direction of the steered wheel indicates the original direction of the steered wheel, whereas a line a indicates the travel direction of the steered wheel. In FIG. 5, when a point A indicates a contact start point, and a point B indicates a contact end point, the tread slides on the road surface by a slip angle, and is displaced from center line x to be deformed along the line a. The area of the tread displaced and deformed is indicated by hatching. In the distorted area, the area on the point A side is an adhering area, and the area on the point B side is the slip area. The lateral force Fy is applied to a force application point on the contact patch of the steered wheel when turning at the slip angle, and the resulting moment about the vertical axis is the self-aligning torque SAT. In FIG. 5, the distance between the center of contact of the steered wheel and the force application point is the pneumatic trail, and the sum of the pneumatic trail and the caster trail is the trail.

Figure 6:
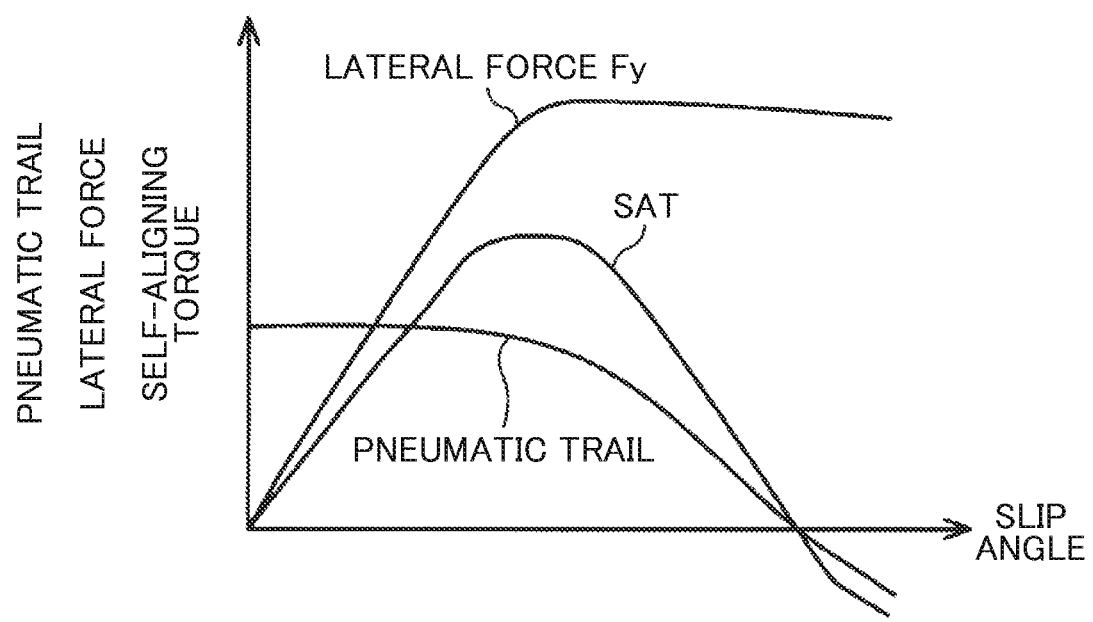
FIG. 6 is a graph illustrating changes in lateral force, self-aligning torque, and pneumatic trail, with respect to changes in slip angle.

FIG. 6 illustrates changes in lateral force, self-aligning torque, and pneumatic trail, with respect to changes in slip angle. As illustrated in FIG. 6, on the steering wheel during a turn, in the range where the slip angle is small, the self-aligning torque SAT linearly increases as the lateral force Fy linearly increases. In the range where the slip angle is large, the self-aligning torque SAT gradually decreases. When the axial force during a turn is regarded as the self-aligning torque SAT, the relationship between the self-aligning torque SAT and the lateral force Fy can be represented by a parameter corresponding to the pneumatic trail from the center of contact between the steered wheel and the road surface to the force application point of the lateral force as illustrated in FIG. 5.

That is, the following equation holds:

$$\text{SAT} = \text{Lateral Force } Fy \times \text{Pneumatic Trail} \quad (c4)$$

When the self-aligning torque SAT is regarded as the axial force (the axial force≈the reaction force from the road surface), the road surface axial force Fer (first estimated axial force) based on a drive current (that is, the current iq) of the steering operation motor 56 approximately expresses the self-aligning torque SAT.

As for the lateral force Fy, by substituting the lateral force Fy (the force generated on each steered wheel 30) with the force generated in the vehicle lateral direction (the lateral force Fy≈the force generated in the vehicle lateral direction), the lateral force Fy can be approximately expressed by the lateral acceleration LA. Note that if the lateral acceleration LA is used alone, the responsiveness upon start of movement is not sufficient with respect to the actual axial force. Thus, a differential of the yaw rate $\gamma$ is added to improve the responsiveness, so that the equation (c2) described above is obtained.

From equation (c4) and equation (c2) described above, the grip factor can be represented by the following equation:

$$\text{Grip Factor } Gr = \text{Self-aligning Torque } SAT/\text{Lateral Force } Fy = \quad (c3') \\ (K3 \times \text{First Estimated Axial Force})/ \\ (K4 \times \text{Second Estimated Axial Force})$$

In this manner, the grip factor Gr can be expressed by self-aligning torque SAT/lateral force Fy, and can also be expressed by (axial force component based on drive current of steering operation motor 56)/(axial force component based on vehicle state quantity).

As illustrated in FIG. 2, the grip factor Gr obtained from the calculation described above is output to the first gain calculation circuit M40, the second gain calculation circuit M42, and the third gain calculation circuit M44. The first gain calculation circuit M40 includes a map defining the relationship between the grip factor Gr and the first gain Ka. The map sets the relationship such that, for example, the first gain Ka increases as the grip factor Gr decreases, and the first gain Ka decreases as the grip factor Gr increases.

However, the relationship is not limited thereto. For example, the map may set the relationship such that the first gain Ka decreases as the grip factor Gr decreases, and the first gain Ka increases as the grip factor Gr increases. The calculated first gain Ka is output to the reaction torque setting processing circuit M6, and is multiplied by the reaction torque Trqa*. Thus, the reaction torque Trqa* varies in accordance with the first gain Ka, so that the steering reaction force varies.

The second gain calculation circuit M42 includes a map defining the relationship between the grip factor Gr and the second gain Kb. The map sets the relationship such that, for example, the second gain Kb increases as the grip factor Gr decreases, and the second gain Kb decreases as the grip factor Gr increases. However, the relationship is not limited thereto. For example, the map may set the relationship such that the second gain Kb decreases as the grip factor Gr decreases, and the second gain Kb increases as the grip factor Gr increases. The calculated second gain Kb is output to the target steering angle calculation processing circuit M20, and is multiplied by a reciprocal of the inertia coefficient J. Thus, the inertia term varies in accordance with the second gain Kb, so that the steering reaction force varies.

The third gain calculation circuit M44 includes a map defining the relationship between the grip factor Gr and the third gain Kc. The map sets the relationship such that, for example, the third gain Kc increases as the grip factor Gr decreases, and the third gain Kc decreases as the grip factor Gr increases. However, the relationship is not limited thereto. For example, the map may set the relationship such that the third gain Kc decreases as the grip factor Gr decreases, and the third gain Kc increases as the grip factor Gr increases. The calculated third gain Kc is output to the target steering angle calculation processing circuit M20, and is multiplied by the viscosity coefficient C. Thus, the viscosity term varies in accordance with the third gain Kc, so that the steering reaction force varies. With the steering control device having the configuration described above, since the grip factor of each steered wheel 30 is appropriately calculated, a steering reaction force corresponding to the grip state is applied to the driver.

The above-described present embodiment provides the following effects.

(1) In the present embodiment, the control device 80 (reaction force control circuit) includes the road surface axial force calculation circuit M10*ac* (first estimated axial force calculation circuit) that calculates the road surface axial force Fer (first estimated axial force), based on the road surface information. The control device 80 (reaction force control circuit) further includes the second estimated axial force calculation circuit M10*aae* that calculates the lateral force Fy (second estimated axial force) applied to the rack shaft 46 (steering operation shaft), based on the yaw rate γ and the lateral acceleration LA (vehicle state quantities). The control device 80 (reaction force control circuit) further includes the grip factor calculation circuit M10*aaf* that calculates the grip factor Gr, based on the road surface axial force Fer (first estimated axial force) and the lateral force Fy (second estimated axial force). Then, the control device 80 (reaction force control circuit) varies the steering reaction force in accordance with the grip factor Gr. Accordingly, even when the steered wheel is replaced or when the air pressure of the steered wheel changes, it is possible to reduce erroneous detection of the grip state, and improve the robustness in controlling the steering reaction force.

(2) In the present embodiment, when the self-aligning torque SAT of each steered wheel 30 is defined to correspond to the first estimated axial force, and the lateral force Fy applied to each steered wheel 30 is defined to correspond to the second estimated axial force, the grip factor Gr is calculated using the expression corresponding to dividing the self-aligning torque by the lateral force. Accordingly, the grip factor Gr can easily be calculated from the quantity related to the self-aligning torque SAT and the lateral force.

(3) In the present embodiment, the lateral force Fy is the sum of the lateral acceleration LA and the differential value of the yaw rate γ each being the vehicle state quantity applied to the vehicle. As a result, according to the present embodiment, although the responsiveness upon start of movement decreases if the lateral acceleration LA is used alone, the responsiveness upon start of movement can be improved by adding the differential value of the yaw rate γ to the lateral acceleration LA.

(4) In the present embodiment, the control device 80 (reaction force control circuit) calculates the gain (Ka, Kb, and Kc) corresponding to the grip factor (Gr), and varies the steering reaction force in accordance with the gain (Ka, Kb, and Kc).

Thus, according to the present invention, by obtaining the gain corresponding to the grip factor and using the obtained gain in the processing for reaction force control, the reaction force control circuit can easily vary the steering reaction force in accordance with the grip factor.

The embodiment described above may be implemented in the following forms. In the above embodiment, the road surface axial force Fer does not have to be calculated based on the q-axis current iq. The axial force applied to the steered wheels 30 may be directly detected using, for example, a pressure sensor or the like for the rack shaft 46 capable of detecting an axial force, and a detection result may be used as the road surface axial force Fer.

In the above embodiment, each of the reaction force motor 26 and the steering operation motor 56 is not limited to an SPMSM but may be an IPMSM. In each embodiment, the steering operation actuator 40 may be configured such that the steering operation motor 56 is arranged, for example, coaxially with or parallel to the rack shaft 46 so long as the steering operation actuator 40 is of a rack assist type.

In the above embodiment, the control device 80 may include dedicated hardware (ASIC) besides the CPU 82 and the memory 84. A part of the processing performed by the CPU 82 may be executed by the hardware, from which the result of the processing may be acquired by the CPU 82.

In the above embodiment, the gains Ka, Kb, and Kc corresponding to the grip factor are used. However, it is not necessary to use all the gains Ka, Kb, and Kc, and it is only necessary to use at least one of the gains.

In the above embodiment, the present invention is implemented as a steer-by-wire steering system including the clutch 12. However, the present invention may be implemented as a steer-by-wire steering system not including a clutch. The values of the allocation gains Gib and Ger may be set such that the total of the allocation gains Gib and Ger is 1 regardless of the drive mode DM. In this case, the gain calculation circuit M10*aaa* may calculate one of the allocation gains Gib and Ger based on the map and calculate the remaining allocation gain by subtracting the calculated allocation gain from 1. The values of the allocation gains Gib and Ger may be set such that the total of the allocation gains Gib and Ger is less than 1. Various types of steering feel can be realized by varying the manner of setting the allocation gains Gib and Ger as described above.

For parameters used to calculate the allocation gains Gib and Ger, instead of the drive mode DM and the vehicle speed V, the following parameters may be used: the steering angle θh, the steered angle θp, a rotational angular velocity (what is called a yaw rate) around a vertical axis passing through a center of gravity of the vehicle, and a difference in wheel speed between wheel speed sensors provided for the right and left steered wheels 30. The parameters including the drive mode DM and the vehicle speed V may each be independently used or may be optionally combined together. The allocation gains Gib and Ger may be calculated based on information obtained from a GPS or the like. Thus, parameters to be focused on can be optionally selected to adjust the steering feel, thereby increasing the degree of freedom in adjustment of the steering feel.

For each of the allocation gains Gib and Ger, the relation with the vehicle speed V can be changed. For example, the value of the allocation gain Gib may decrease as the vehicle speed V increases. The value of the allocation gain Ger may increase as the vehicle speed V increases. That is, for each of the allocation gains Gib and Ger, the relation with the vehicle speed V may be set in accordance with specifications of the vehicle, a usage environment thereof, or the like.

The types of the drive mode DM may be increased or reduced in accordance with the specifications of the vehicle or the like. In this case, the map may be provided in accordance with the types of the drive mode DM. Further, the drive mode DM does not have to be selected by the user, and may be automatically selected by the control device 80 (vehicle side), for example, in accordance with the traveling state of the vehicle or the user's operation.

In the above embodiment, the ideal axial force Fib may be calculated by any other method, for example, based on a parameter other than the target steered angle θp* such as the target steering angle θh*, the steering torque Trqs, or the vehicle speed V.

In the above embodiment, the road surface axial force Fer may be estimated by any other method, for example, calculation based on a variation in yaw rate or vehicle speed. In the above embodiment, the limiting reaction force setting processing circuit M10b may be omitted from the reaction force setting processing circuit M10.

The target steering angle calculation processing circuit M20 and a target steered angle calculation processing circuit M48 may use a model formula based on a model additionally including a so-called spring term and using a spring constant K determined by specifications of a suspension and wheel alignment.

In the above embodiment, the maximum value selection processing circuit M36 uses a pair of parameters, namely, the steering angle θh and the steered angle θp, as comparison objects to be compared with the thresholds. However, the invention is not limited thereto. For example, for a four-wheel drive vehicle, three parameters including the steered angle of the front wheels, the steered angle of the rear wheels, and the steering angle may be used. In this case, the maximum value selection processing circuit M36 selects the maximum value θe from the three parameters. For the four-wheel drive vehicle, if the four steered wheels have different steered angles, five parameters including the four steered angles and one steering angle may be used.

In the above embodiment, the maximum value selection processing circuit M36 may use only one parameter as a comparison object to be compared with a threshold. For example, only the steered angle θp may be used as a parameter in the case where the spiral cable 68 is prevented from being fully stretched as the spiral cable 68 is provided with a margin in length and the steered angle θp is controlled to a steered angle threshold or smaller regardless of the steering angle ratio. Alternatively, only the steering angle θh may be used as a parameter in the case where the spiral cable 68 has no margin and the rack shaft 46 is prevented from coming into contact with the rack housing 44 as the steering angle θh is controlled to a steering angle threshold or smaller regardless of the steering angle ratio.

In the above embodiment, the steering angle feedback processing circuit M22 may calculate a manipulated variable (target reaction torque Trqr*) of the reaction force actuator 20 based on the sum of the output values of the proportional element and the differential element to which a value obtained by subtracting the steering angle θh from the target steering angle θh* is input, or only the output value of the proportional element. In the above embodiment, the steered angle feedback processing circuits M32 and M50 may calculate a manipulated variable (target steered torque Trqt*) of the steering operation actuator 40 based on the sum of the output values of the proportional element and the differential element to which a value obtained by subtracting the steered angle θp from the target steered angle θp* is input, or only the output value of the proportional element.

What is claimed is:

1. A steering control device that controls a steer-by-wire steering system for a vehicle, the steering control device comprising:
   a steering operation control circuit that controls a steering operation actuator of the steer-by-wire steering system in accordance with a steering state of a steering wheel, the steering system including (i) a reaction force actuator that applies a steering reaction force against an operation of the steering wheel, and (ii) the steering operation actuator that steers steered wheels via a steering operation shaft under a condition where power is not transmitted between the steered wheels and the steering wheel; and
   a reaction force control circuit that calculates the steering reaction force and changes the steering reaction force in accordance with changes in a calculated grip factor by varying an output of the reaction force actuator, the reaction force control circuit including:
      a first estimated axial force calculation circuit that calculates a first estimated axial force based on road surface information, the road surface information being calculated based on an axial force applied to each steered wheel of a plurality of steered wheels and a parameter of a current in the steering operation actuator, which is provided by a steering operation motor of the steering operation actuator;
      a second estimated axial force calculation circuit that calculates a second estimated axial force applied to the steering operation shaft based on a vehicle state quantity; and
      a grip factor calculation circuit that calculates the grip factor based on the first estimated axial force and the second estimated axial force.

2. The steering control device according to claim 1, wherein, when a self-aligning torque of each of the steered wheels is defined to correspond to the first estimated axial force, and when a lateral force applied to each of the steered wheels is defined to correspond to the second estimated axial force, the grip factor is calculated using an expression that divides the self-aligning torque by the lateral force.

3. The steering control device according to claim 2, wherein the lateral force is a sum of a lateral acceleration and a differential value of a yaw rate, which are each the vehicle state quantity applied to the vehicle.

4. The steering control device according to claim 1, wherein the reaction force control circuit calculates a gain corresponding to the grip factor, and changes the steering reaction force in accordance with the calculated gain.

\* \* \* \* \*